United States Patent [19]

Koerdt et al.

[11] 4,405,055
[45] Sep. 20, 1983

[54] VAULTED COVER WITH FLANGE AND PLURALITY OF PIPE FITTINGS

[75] Inventors: Reinhold Koerdt, Hemsbach; Josef Schoening, Hambruecken; Hans-Georg Schwiers, Ketsch, all of Fed. Rep. of Germany

[73] Assignee: Hochtemperatur-Reaktorbau GmbH, Cologne, Fed. Rep. of Germany

[21] Appl. No.: 217,815

[22] Filed: Dec. 18, 1980

[30] Foreign Application Priority Data

Feb. 16, 1980 [DE] Fed. Rep. of Germany ....... 3005905

[51] Int. Cl.$^3$ .............................................. B65D 6/10
[52] U.S. Cl. .................................. 220/215; 220/367; 52/245
[58] Field of Search ................. 52/245, 300, 301, 224, 52/248, 404; 220/215, 468, 3, 367, 435, 436, 437

[56] References Cited

U.S. PATENT DOCUMENTS

| | | | |
|---|---|---|---|
| 3,140,792 | 7/1964 | Harris | 220/215 |
| 3,713,459 | 1/1973 | McIver et al. | 52/224 X |
| 3,733,760 | 5/1973 | Koerner | 52/245 X |
| 3,744,660 | 7/1973 | Gaines et al. | 220/437 |
| 4,195,457 | 4/1980 | Kissling et al. | 52/245 X |

FOREIGN PATENT DOCUMENTS 2159781 8/1972 Fed. Rep. of Germany.
2914040 10/1979 Fed. Rep. of Germany.

Primary Examiner—Carl D. Friedman
Attorney, Agent, or Firm—Schwartz, Jeffery, Schwaab, Mack, Blumenthal & Koch

[57] ABSTRACT

A vaulted cover for an opening in a pressure vessel comprising a vaulted center piece and an annular rim surrounding thermal insulation material of a cover flange. The rim is assembled of two coaxially arranged cylindrical sections. Expansion gaps and sealing disks are provided about pipe fittings in said vaulted cover in a manner that permits release of pressure through gaps formed by said sealing disks.

13 Claims, 6 Drawing Figures

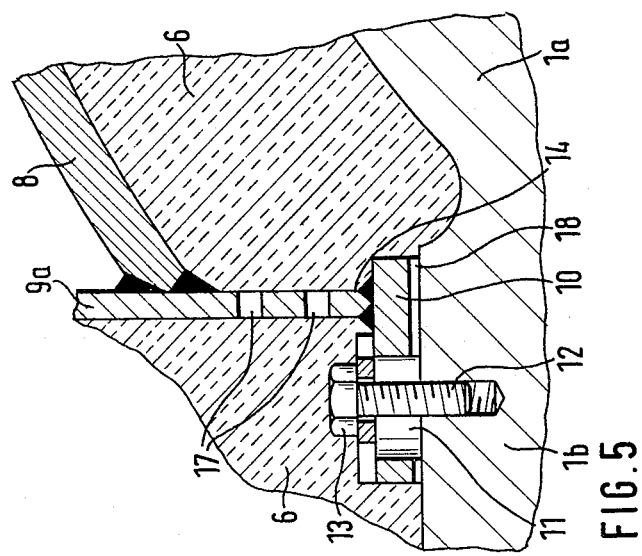
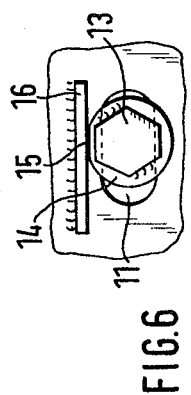
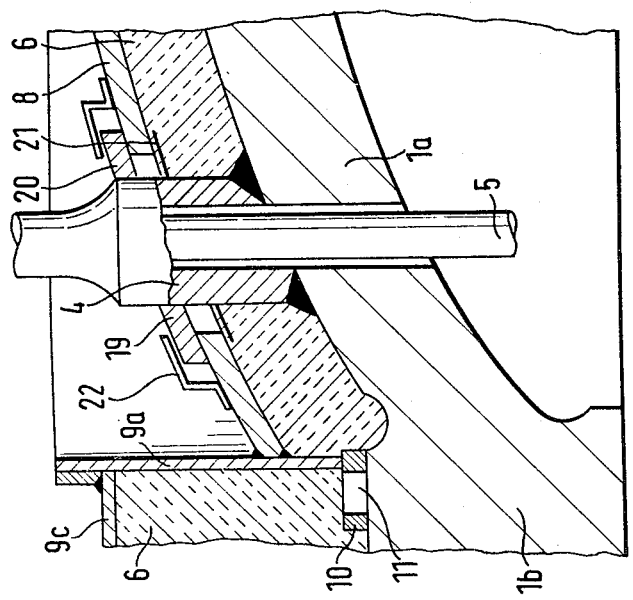

VAULTED COVER WITH FLANGE AND PLURALITY OF PIPE FITTINGS

BACKGROUND OF THE INVENTION

1. Field of the Invention:

The present invention concerns a vaulted cover equipped with a flange for the closing of an opening in a pressure vessel. More particularly, a cover for a pressure vessel that is held on by means of fastening elements leading through the flange. The cover is also equipped with a plurality of fittings welded thereon for the passage of steam pipes and with thermal insulation on the outside of the vaulted part of the cover and the cover flange. The thermal insulation consists of a thermal insulating material and a metallic covering applied to the thermal insulating material.

2. Background of the Prior Art:

Covers of the above-described type are used, for example, as closures for nuclear power station components, such as steam generators or coolers wherein high operating temperatures are prevalent. The covers must, therefore, be provided with thermal insulation. The design of such insulations present a difficult technical problem in itself, because the covers have numerous passages for steam pipes. Thus, the thermal insulation must be interrupted at these locations. Furthermore, the large differential thermal expansion of a vaulted cover of this type and of the metallic covering of its thermal insulation must be taken into consideration.

The state-of-the-art is represented by thermally insulating installations of walls exposed to a gaseous heat carrier. Thus, West German Offenlegungsschrift No. 21 59 781 discloses a type of thermal insulation for a reactor pressure vessel comprising several layers of highly porous metallic mesh and a number of thin metal sheets between the layers. The insulation is covered with retaining metal sheets fastened with bolts to the liner of the pressure vessel. A number of gaps due to manufacturing tolerances between the individual plates of the insulating material and the retaining sheets serve to connect the layers of mesh under pressure with the heat barrier.

In West German Offenlegungsschrift No. 29 14 040 another thermally insulating installation for surfaces of a nuclear reactor is described. It consists of several layers of a metal fabric or metal mesh separated by intermediate metal sheets which are combined into panels. The panels, covered at their circumference with a wrapper, are applied on one side against the surface to be protected and are covered on the other side with a supporting sheet. The panels are secured to the surface to be protected and to the supporting sheets by means of hollow bolts with nuts screwed onto their "hot" ends.

It has also been proposed to provide the fastening bolts of thermal insulations of this type with a spacer sleeve supported on one end by the surface to be protected and on the other end connecting with the stationarily supported retaining sheets of cover plates. The method of fastening them is such that the thermal expansion of the cover plates is not hindered.

SUMMARY OF THE INVENTION

It is an object of the present invention to design and secure the thermal insulation in the case of a vaulted cover of the above-described type, such that it will be capable, in spite of the differential thermal expansion of the cover and the covering of the insulation of absorbing additional stresses caused, for example, by failures or rapid changes in pressure.

Rapid pressure variations occur, for example, when safety valves are opened. In order to prevent the destruction of thermal insulation in such cases, the possibility of pressure equalization must be provided. An example of a failure capable of leading to damage to the insulation is the fracture of a steam pipe installed through the vaulted cover. As a consequence of such a failure, the cover is exposed to temperatures that are far in excess of the exposure at operating temperatures. The insulation, however, must be able to withstand not only this increased temperature load, but must also survive the mechanical stress due to the jet of steam without damage so that it may fullfil its function without repairs during the subsequent operation of the components.

The objects and advantages of the present invention are attained by a metallic covering comprising a vaulted center piece and an annular rim surrounding the thermal insulating material of the cover flange. The rim is assembled of two coaxially arranged cylindrical sections and a disk-shaped part covering the annular space between the cylindrical sections. The vaulted center part is welded to the inner cylindrical section and both cylindrical sections are fastened by means of a sliding seat each on the cover flange. Around each of the fittings in the center part of the cover an expansion gap sealed by means of a disk is provided. The disks are placed at a distance from the cover. Between the disks and the corresponding fittings, gaps are provided to act as pressure relief orifices.

With the thermal insulation proposed herein, the differential thermal expansions of the cover and the coverings of the insulation cannot have harmful consequences. To the contrary, they may be equalized by way of the sliding seats. The expansion gaps provided around each of the fittings further permit the uninhibited thermal expansion of the center part of the cover.

Between the disks provided to seal the expansion gap and the fittings, there always remains a gap for reasons of tolerance. If in the case of the fracture of a pipe, hot steam should be able to penetrate into the insulation through this gap; it would lead firstly to the destruction of the thermal insulating material and secondly to a pressure buildup within the insulation which would then blow off the entire cover. In order to eliminate this danger, a gap is provided between the disk and the covering, thus making possible the escape of the steam entering under the disks. In operation, steam is diverted into another direction and, therefore, does not enter the thermal insulation.

The presence of this relief gap between the covering and the disks also makes possible the equalization of pressure by way of the gap around the fittings in case of changes in pressure (for example, as the result of the opening of safety valves). The gap thus acts as a pressure relief orifice.

The combination of the characteristics described hereinabove assures in the cover, according to the invention, that the thermal insulation will satisfy the requirements posed. A replacement of the insulation after failures or changes in pressure will, therefore, not be necessary.

A vaulted cover designed in keeping with the invention has further advantage with respect to installation that the thermal insulation intended for the vaulted part of the cover, separately from the insulation for the flange of the cover, may be installed in the factory prior to the final mounting of the cover (i.e. prior to its screwing onto the pressure vessel). This results in a simple manufacturing process of the cover.

In view of the large number of fittings penetrating through the insulation, ceramic fiber wool is conveniently used as the insulation. If the invention is applied in a nuclear power station, a reactory quality fiber wool is selected. A fiber wool of this quality does not release aggressive substances when invaded by humidity and the spring rebound of the fibers is preserved.

The annular disks for the sealing of the expansion joints are held in place advantageously by means of Z corners, fixedly mounted on the center part of the covering. Together with the disks, they form a sliding seat so that the disks may expand without hindrance.

The formation of the relief gap described hereinabove between the annular disks and the covering, i.e. the maintenance of a certain distance between these structural elements, may be effected by placing the disks on elevations provided on the covering. In the simplest manner, the elevations may be represented by point welds applied to the covering.

It is convenient to select a diameter for the annular disks that is larger than the diameter required for the sealing of the expansion joint and to provide a bevel on one side of each disk. The dimension and arrangement of these bevels is such that the rotation of the disks is prevented.

The functioning of the pressure relief gap between the disks and the covering which is designed to prevent the penetration of hot steam in the insulating material or at least to render it extremely difficult, may be further enhanced by the arrangement of foil between the covering and the insulating material. The foil arranged around each fitting is dimensioned so that the ceramic fiber wool cannot swell out and the steam jet cannot enter the fiber wool.

As described hereinabove, the annular rim part of the covering consists of two coaxial, cylindrical sections and a disk shaped part to cover the annular space between the two sections. In the "annular channel" formed in this manner, the thermal insulating material for the cover flange is located. The individual parts of the "annular channel" may be secured together in a simple manner by means of bolts.

The sliding seats whereby each cylindrical section is fastened to the cover flange, may consist of a flange welded to the cylindrical section involved and equipped with a plurality of elongated holes. The elongated holes serve to guide the threaded bolts screwed into the cover flange. They permit the sliding of the threaded bolts and thus make the equalization of the differential thermal expansions of the cover flange and the covering possible.

A torsional lock is provided for each threaded bolt. This consists in each case of a bar welded to the flange of the section and a washer cut off on one side and welded to the threaded bolt. The washer slides with its cut side along the bar and thus cannot rotate. The threaded bolt, fixedly connected with the washer is thereby also rendered secure against rotation.

In order to prevent a buildup of the pressure in the "annular channel" by way of the cover flange, pressure relief bores may be provided in both of the cylindrical sections. The flange of the cylindrical sections may also contain orifices for pressure equalization purposes, for example, in the form of recesses worked into the front side of the flange.

BRIEF DESCRIPTION OF THE DRAWINGS

In the drawing, examples of various embodiments of the vaulted cover according to the invention are shown schematically.

FIG. 4 shows a section of FIG. 1 designated by an "X" in an enlarged representation;

FIG. 5 shows an enlarged section of FIG. 4; and

FIG. 6 represents a top view of a section of FIG. 5 with its rotational lock.

DETAILED DESCRIPTION OF THE INVENTION

Figures 1, 2:
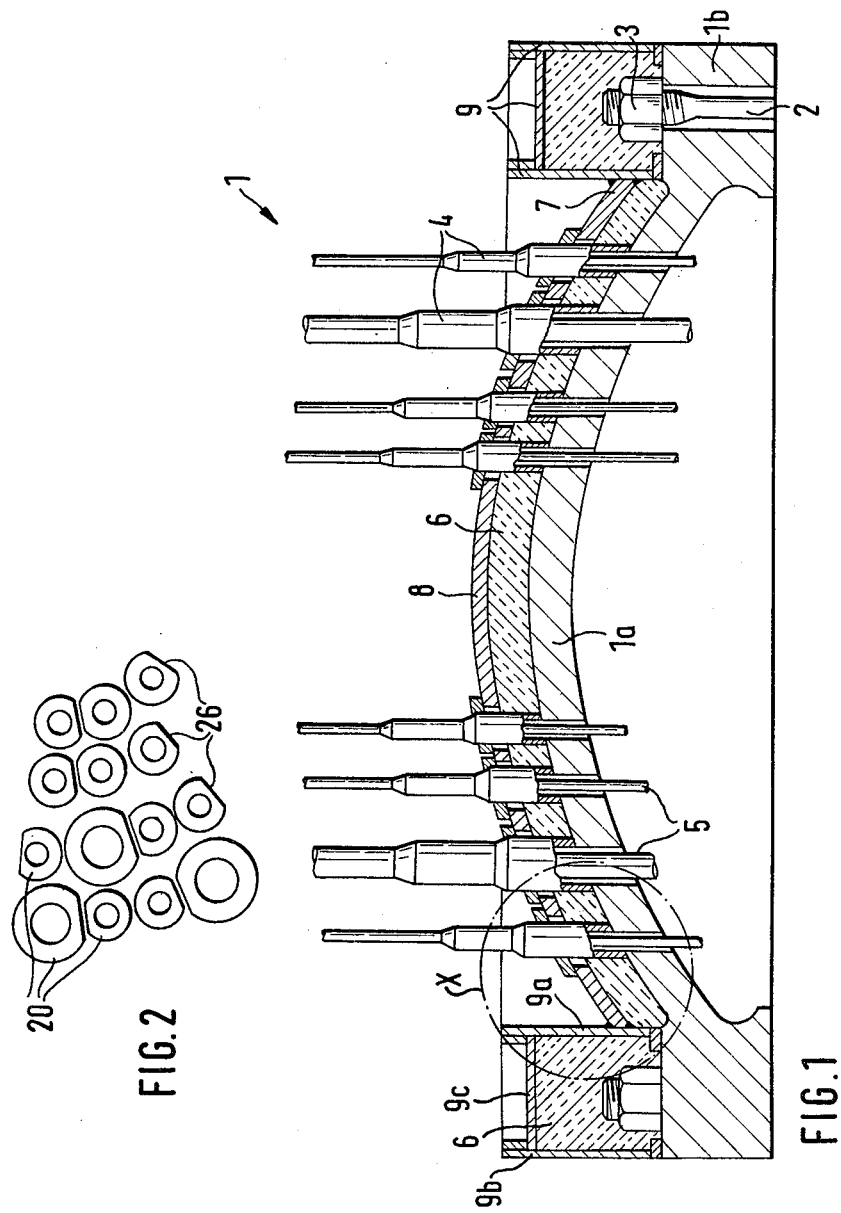
FIG. 1 shows a longitudinal section through the entire cover.
FIG. 2 represents a top view of a section of the center part of the cover according to FIG. 1.

FIG. 1 shows a cover 1 consisting of a vaulted cover part 1a and a cover flange 1b and provided on the outside with thermal insulation.

The cover 1 serves to close an opening of a pressure vessel (not shown). The cover is held by means of threaded bolts 2 inserted through the cover flange 1b and nut 3. A plurality of steam pipes 5 extend from inside the pressure vessel to the outside. The steam pipes 5 penetrate through the cover 1 and the cover insulation and are installed within this area inside of fittings 4 welded to the cover 1.

The thermal insulation includes a thermal insulation material 6 which comprises a ceramic fiber wool and a metallic covering 7 for the thermal insulating material 6. The metallic covering 7 is pressure resistant and protects the thermal insulating material against mechanical stresses. The metallic cover 7 further has a vaulted center part 8 located above the vaulted part 1a of the cover and an annular rim member 9, which surrounds the thermal insulating material 6 of the cover flange 1b. The annular rim member 9 is assembled by the screwing together of two coaxially arranged cylindrical sections 9a and 9b and a disk shaped part 9c with the latter covering the annular space filled with the insulating material 6 between the sections 9a and 9b.

The vaulted center part 8 of the covering 7 is welded to the inner cylindrical section 9a. Both of the sections 9a and 9b are secured to the cover flange 1b by means of a sliding seat.

As shown by FIG. 5 the sliding seat of each of the sections 9a, 9b consists of a flange 10 welded to the section involved with a plurality of longitudinal holes 11, through which the threaded bolts 12 are inserted.

The threaded bolts 12 are screwed into the cover flange 1b. A washer 14 is placed under each bolt head 13. The washers are welded to the threaded bolt 12 and have a unilateral cutoff 15, as shown in FIG. 6. With its cut side, the washer 14 slides during thermal movements of the sections 9a and 9b respectively, along the bar 16 that is welded within the range of each threaded bolt 12 to the flange 10. The bar 16 prevents rotating movements of the washer 14 and thus, those of the threaded bolt 12 fixedly connected with said washer.

As seen further in FIG. 5, a plurality of orifices 17 are provided in the cylindrical sections 9a and 9b (only 9a is shown). These orifices serve as pressure relief bores.

Further orifices are found in the flanges 10 of the two cylindrical sections 9a and 9b to prevent the buildup of pressure in the thermal insulating material 6. The orifices are in the form of recesses 18 in the surface facing the cover flange 1b of the flange 10.

Figure 3:
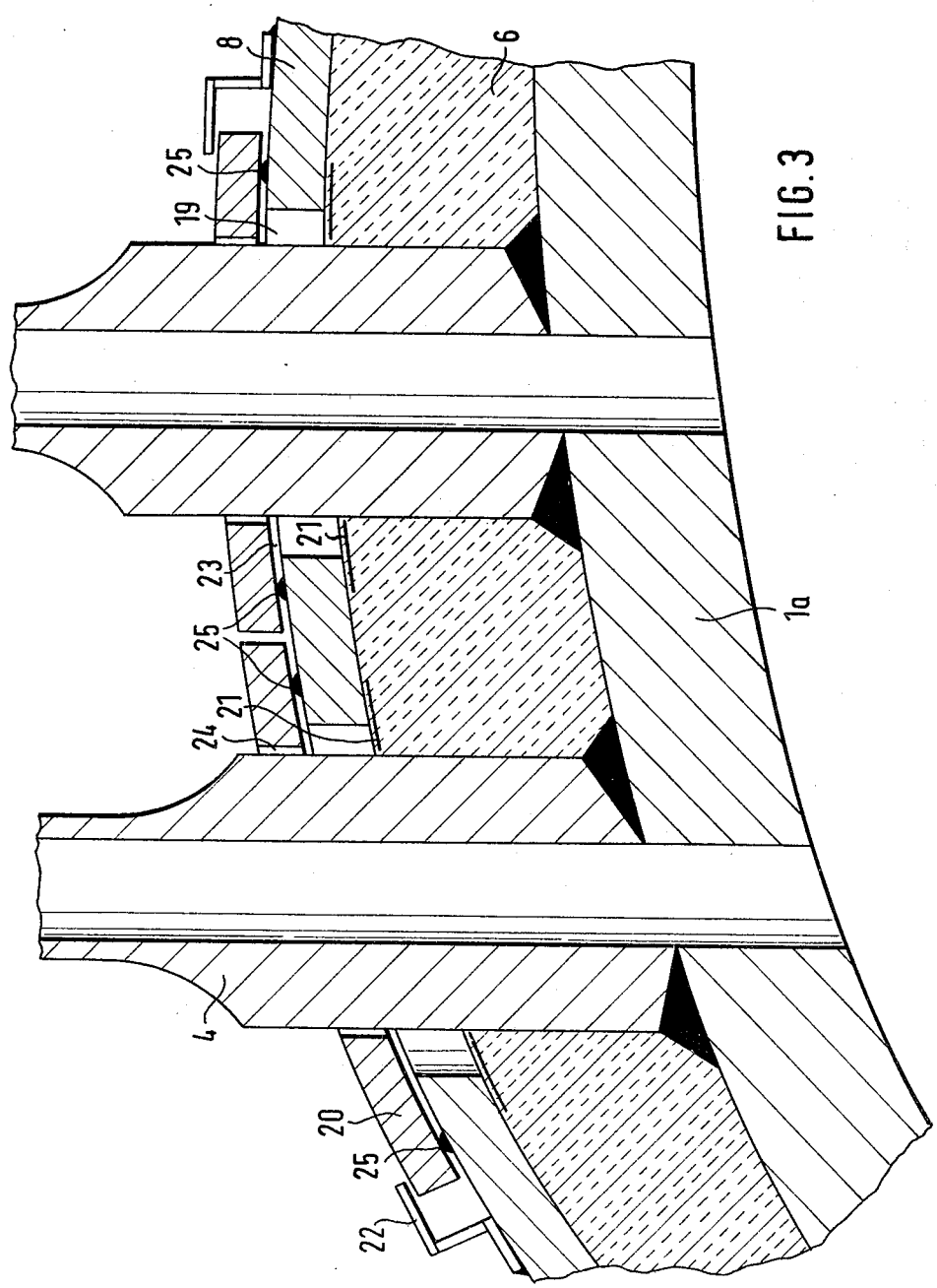
FIG. 3 represents a larger scale, longitudinal section of a portion of the center part of the cover shown in FIG. 1.

FIGS. 3 and 4 show that the vaulted center part 8 of the covering 7 an expansion gap 19 is present around each fitting 4, which assures the unimpeded thermal expansion of the center part 8. In order to prevent the entrance of hot steam in case of a failure, each expansion gap 19 is covered with a disk 20. Additionally, around each of the fittings 4, a foil cover 21 is arranged between the center part 8 of the covering 7 and the thermal insulating material 6.

The annular disks 20 are held on the covering 7 with the aid of Z corners 22, resting loosely on the disk 20 so as not to interfere with the thermal expansion of the latter. The covering 7 is fixedly connected with the Z angles 22. The disks 20 are fastened so that a distance remains between the disks 20 and the covering 7; i.e. a gap 23 is provided between the disks and the covering, which has the effect that a jet of steam penetrating through annular gaps 24 between the fittings 4 and the disks 20 (existing because of techanical tolerances) is able to flow out under the disks 20. The gaps 24 act as pressure relief orifices not only in this case, but also when, for example, as the result of the opening of safety valves there is a change of pressure in the installation.

In FIG. 3 the pressure relief orifices 24 and the relief gap 23 are shown. This figure also shows that the distance between the center part 8 of the covering 7 and the disks 20 may be maintained in a simple manner, i.e. by the application of spot welds 25 to the center part 8.

In order to prevent the rotation of the disks 20, their diameter is larger than would be necessary to seal the expansion gap 19 and the disks are cut off on one side 26. The disks 20 are arranged so that the cutoffs of two adjacent sides abut against each other. The disks 20 thus cannot rotate.

What is claimed is:

1. A vaulted cover for an opening in a pressure vessel comprising:
    a first metal covering having a vaulted center piece and an annular rim member;
    a plurality of pipe fittings welded onto said first covering;
    a second metal covering adjacent said first metal covering, forming a space therebetween and having an annular flange;
    thermal insulation material in said space between said first and second metal coverings;
    said rim member comprising an inner annular cylindrical section and an outer cylindrical section coaxially arranged to form an annular space therebetween and a disk-shaped member covering said annular space
    wherein said vaulted center piece is welded to the inner cylindrical section and both of said cylindrical sections are fastened to said flange on said second metal covering by a sliding seat.
2. The vaulted cover of claim 1 comprising:
    a plurality of annular disks, each disk surrounding a single pipe fitting.
3. The vaulted cover of claim 2, wherein said annular disks are placed at a distance from said first metal covering to form a pressure relief gap.
4. The vaulted cover of claim 1, wherein the thermal insulation material is ceramic fiber wool.
5. The vaulted cover of claim 2, wherein said annular disks are held in place by Z shaped fasteners, fastened to said vaulted center piece.
6. The vaulted cover of claim 2, wherein said annular disks rest on elevations in the outer surface of said vaulted center piece.
7. The vaulted cover of claim 3, wherein the annular disks have diameters larger than that required for the sealing of said gap and are provided with means to prevent the rotation of the disks.
8. The vaulted cover of claim 3, wherein said thermal insulating material is sealed with foil in the area of said pipe fittings.
9. The vaulted cover of claim 1, wherein said inner and outer cylindrical sections of the annular rim member of the covering are screwed together with the disk-shaped part.
10. The vaulted cover according to claim 1, wherein said sliding seat comprise a flange member welded to said inner cylindrical section and at least one elongated hole in said flange member serving to guide a threaded bolt screwed into the annular flange of said second metal covering.
11. The vaulted cover of claim 10, including a torsional safety means for said threaded bolt said means including a bar welded to the flange member and a washer cutoff on one side and welded to the threaded bolt with the cut side of said washer abutting against the bar.
12. The vaulted cover of claim 1 wherein pressure relief bores are provided in both of the cylindrical sections.
13. The vaulted cover of claim 1 wherein the flange member of the inner cylindrical section is provided with recesses for the equalization of pressure.

* * * * *